(12) United States Patent
Sogawa et al.

(10) Patent No.: US 7,269,120 B2
(45) Date of Patent: Sep. 11, 2007

(54) OPTICAL PICKUP

(75) Inventors: Teruaki Sogawa, Osaka (JP); Fumiaki Mori, Osaka (JP); Noritaka Tanabe, Osaka (JP)

(73) Assignee: Funai Electric Co., Ltd., Osaka (JP)

( * ) Notice: Subject to any disclaimer, the term of this patent is extended or adjusted under 35 U.S.C. 154(b) by 634 days.

(21) Appl. No.: 10/759,088

(22) Filed: Jan. 20, 2004

(65) Prior Publication Data

US 2004/0218501 A1    Nov. 4, 2004

(30) Foreign Application Priority Data

Jan. 23, 2003    (JP)    ............................ P2003-015130

(51) Int. Cl.
*G11B 21/16*    (2006.01)
(52) U.S. Cl. .................. 369/244.1; 369/121; 369/122; 369/112.01
(58) Field of Classification Search ...................... None
See application file for complete search history.

(56) References Cited

U.S. PATENT DOCUMENTS

| | | | | |
|---|---|---|---|---|
| 4,653,856 A | * | 3/1987 | Kamiko | 359/824 |
| 6,034,940 A | * | 3/2000 | Lee | 720/685 |
| 6,377,407 B1 | * | 4/2002 | Susuki et al. | 359/814 |
| 6,983,472 B2 | * | 1/2006 | Ito | 720/648 |
| 2004/0017762 A1 | * | 1/2004 | Sogawa et al. | 369/120 |

FOREIGN PATENT DOCUMENTS

JP    11-016205    1/1999

* cited by examiner

*Primary Examiner*—William Korzuch
*Assistant Examiner*—Tawfik Goma
(74) *Attorney, Agent, or Firm*—Morgan, Lewis & Bockius, LLP

(57) ABSTRACT

An optical pickup includes a radiating plate made to abut against a rear surface of a laser diode by positioning an engaging hole provided penetratingly in a central portion of the radiating plate concentrically with the laser diode. Slits are formed in the radiating plate to form a pair of tongues in the manner of point symmetry about an axis of the engaging hole. Screw insertion portions formed in the respective tongues are communicates with the slits. As screws are passed through the screw inserting portions and are screwed in, the radiating plate is secured to the base. When the screws are screwed in, the axis is positioned on a phantom line connecting points of application of force generated at proximal end portions of the tongues. Distances from the axis to the respective points of application of force are set to be substantially identical.

9 Claims, 12 Drawing Sheets

OPTICAL PICKUP

BACKGROUND OF THE INVENTION

1. Field of the Invention

The present invention relates to an optical pickup for use in a disk player such as a DVD player.

2. Description of the Related Art

Conventionally, as techniques of optical pickups, those disclosed in JP-A-11-16205 and the like are known. One such example will be explained with reference to FIG. 13. A photodiode PD is disposed at one end opening 2a of a light passage hole 2 provided penetratingly in a synthetic resin-made base 1 in which a half mirror HM is disposed. A collimator lens QWP and an objective lens OL are disposed in its other end opening 2b, and a laser diode LD and a diffraction grating G are disposed in a laser hole 3 communicating with the light passage hole 2. Laser light is projected from the laser diode LD onto a disk D through the half mirror HM, the collimator lens QWP, and the objective lens OL, and its reflected light is received by the photodiode PD through the half mirror HM to thereby read information recorded on the disk D.

A metallic radiating plate 4 is secured to a laser mounting surface 5 formed at a periphery of the opening of the laser hole 3 in the base 1 by a plurality of (in this arrangement, two) screws 22. An engaging hole 4a provided penetratingly in a substantially central portion of the radiating plate 4 is positioned concentrically with the laser diode LD, thereby causing the radiating plate 4 to abut against a rear surface of the laser diode LD. This arrangement is designed to prevent a decline in the capacity of the laser diode LD when it generates heat due to the projection of the laser light.

In the above-described construction, through holes 4b for insertion of the screws 22 are merely provided penetratingly in the radiating plate 4, as shown in FIGS. 14A and 14B. Consequently, the screws 22 are passed through these through holes 4b and are screwed in threaded holes 23 of the laser mounting surface 5, and heads 22a of the screws 22 are brought into pressure contact with the radiating plate 4. Therefore, the radiating plate 4 is liable to be strained and deformed, so that there are cases where the deformed radiating plate 4 becomes spaced apart from the laser diode LD, thereby making it impossible to sufficiently exhibit a radiating effect (see the phantom lines in FIG. 14B).

SUMMARY OF THE INVENTION

In view of the above-described problem, it is an object of the invention to provide an optical pickup which makes it possible to sufficiently exhibit a radiating effect by a radiating plate and to accurately project laser light by preventing the displacement of a laser diode.

According to a first aspect of the invention, there is provided an optical pickup including: a base made of synthetic resin, the base having a light passage hole penetrating the base, a laser hole communicating with the light passage hole, and a laser mounting surface formed at a periphery of an opening of the laser hole and having threaded holes; a half mirror disposed in the light passage hole; a photodiode disposed on one end opening of the light passage hole; a collimator lens disposed on another end opening of the light passage hole; an objective lens provided at the another end opening of the light passage hole; a laser diode disposed in the laser hole; a metallic holder retained on the laser mounting surface, the holder having a retaining hole provided penetratingly in the holder concentrically with the laser hole and through holes; and a metallic radiating plate attached to an outer surface of the holder, the radiating plate having an engaging hole provided penetratingly in a substantially central portion of the radiating plate and a diameter of which is slightly smaller than that of the retaining hole; wherein laser light is projected from the laser diode onto a disk through the half mirror, the collimator lens, and the objective lens, and reflected light thereof is received by the photodiode through the half mirror, so as to read information recorded on the disk; the laser diode is fitted in the retaining hole of the holder; the engaging hole of the radiating plate is positioned concentrically with the laser diode, thereby clamping the laser diode by the radiating plate and the holder; slits are formed in the radiating plate to form a pair of tongues in the manner of point symmetry about an axis of the engaging hole; screw inserting portions formed in the respective tongues are made to communicate with the slits; screws are passed through the screw inserting portions of the tongues and the through holes of the holder, and are screwed into the threaded holes of the laser mounting surface, thereby securing the radiating plate and the holder to the base; the axis of the engaging hole is positioned on a phantom line connecting points of application of force generated at proximal end portions of the tongues when the screws are screwed in, and distances from the axis to the respective points of application of force are set to be substantially identical; a recessed portion is formed on a portion of the laser mounting surface excluding peripheral edge portions of the threaded holes, thereby defining a gap between the holder and the base; and a plurality of radiating fins are projectingly provided on the holder.

According to the above-described construction, as screws are passed through the screw inserting portions of the tongues and the through holes in the holder, and are screwed into the threaded holes of the base, the radiating plate is secured to the base. In addition, since the tongues are merely connected partially to the radiating plate, the radiating plate can be caused to abut against the rear surface of the laser diode in such a way that the radiating plate will not be deformed.

In addition, since peripheral edge portions of the screw inserting portions of the tongues are formed substantially in C-shapes which are resiliently deformable, as heads of the screws are brought into pressure contact with the tongues with a predetermined pressing force, the points of application of force can be reliably generated at the proximal end portions of the tongues.

The axis of the engaging hole formed in a substantially central portion of the radiating plate is positioned on a phantom line connecting the two points of application of force. Also, distances from the axis to the respective points of application of force are set to be substantially identical. Therefore, the pressing forces acting from the respective points of application of force toward the axis are offset by each other, and components of force are not generated from both pressing forces. Accordingly, the bending moment with the axis of the engaging hole as a center is not generated, and the laser diode is not displaced via the radiating plate by that bending moment. Hence, the laser light can be precisely projected from the laser diode without being positionally offset, so that it is possible to accurately read the information recorded on the disk.

Further, since the laser diode is mounted on the base through the holder, in a case where the laser diode is determined to be defective in inspection prior to shipment, it is possible to discard only that laser diode. Accordingly, it is possible to reuse a diffraction grating and the base separated from the defective laser diode, so that the discarding cost decreases. In addition, since the base is isolated from the heat generation of the laser diode by means of the holder, it is possible to prevent the base from being thermally expanded and deformed.

Furthermore, since the laser diode is clamped by the holder and the radiating plate, the laser diode can be reliably retained in the retaining hole of the holder. Since retaining means such as screws for the retention is not required, the fabrication cost can be reduced.

Furthermore, the arrangement provided is such that the radiating plate and the holder are integrally secured to the base by means of the screws. Hence, as compared with the case where the radiating plate and the holder are separately secured, the securing operation can be performed speedily and easily with a fewer number of screws.

Still further, since areas of contact between the laser diode and the holder and between the laser diode and the radiating plate are large, and the plurality of radiating fins are projectingly provided on the holder, the radiation of the laser diode is accelerated, and the laser diode can be operated efficiently. In addition, since the base is isolated from the heat generation of the laser diode by means of the holder, and the holder and the base are merely in partial contact with each other, there is no possibility of the synthetic resin-made base being thermally expanded and deformed by the heat generation of the laser diode. Hence, it is possible to prevent the occurrence of a read error by maintaining the optical axis connecting the photodiode and the objective lens rectilinearly, as required. It is thereby possible to fabricate an inexpensive and precision optical pickup.

According to a second aspect of the invention, there is provided an optical pickup including: a base made of synthetic resin, the base having a light passage hole penetrating the base, a laser hole communicating with the light passage hole, and threaded holes; a laser diode disposed in the laser hole; a photodiode; and a radiating plate having an engaging hole provided penetratingly in a substantially central portion of the radiating plate, the radiating plate being made to abut against a rear surface of the laser diode while positioning the engaging hole concentrically with the laser diode; wherein laser light is projected from the laser diode onto a disk and reflected light thereof is received by the photodiode so as to read information recorded on the disk; slits are formed in the radiating plate to form a pair of tongues arranging an axis of the engaging hole therebetween; screw inserting portions formed in the respective tongues are made to communicate with the slits; and screws are passed through the screw inserting portions of the tongues and screwed into the threaded holes of the base, thereby securing the radiating plate to the base.

Preferably, an axis of the engaging hole is positioned on a phantom line connecting points of application of force generated at proximal end portions of the tongues when the screws are screwed in.

Preferably, distances from the axis of the engaging hole to the respective points of application of force are set to be substantially identical.

According to the above-described construction, as screws are passed through the screw inserting portions of the tongues and are screwed into the threaded holes of the base, the radiating plate is secured to the base. In addition, since the tongues are merely connected partially to the radiating plate, the radiating plate can be caused to abut against the rear surface of the laser diode in such a way that the radiating plate will not be deformed.

In addition, since peripheral edge portions of the screw inserting portions of the tongues are formed substantially in C-shapes which are resiliently deformable, as heads of the screws are brought into pressure contact with the tongues with a predetermined pressing force, the points of application of force can be reliably generated at the proximal end portions of the tongues.

Further, the axis of the engaging hole formed in a substantially central portion of the radiating plate is positioned on a phantom line connecting the two points of application of force. Also, distances from the axis to the respective points of application of force are set to be substantially identical. Therefore, the pressing forces acting from the respective points of application of force toward the axis are offset by each other, and components of force are not generated from both pressing forces. Accordingly, the bending moment with the axis as a center is not generated, and the laser diode is not displaced via the radiating plate by that bending moment. Hence, the laser light can be precisely projected from the laser diode without being positionally offset, so that it is possible to accurately read the information recorded on the disk.

According to a third aspect of the invention, the optical pickup further includes a metallic holder retained on a laser mounting surface formed at a periphery of an opening of the laser hole of the base, the holder having a retaining hole provided penetratingly in the holder concentrically with the laser hole, wherein the laser diode is fitted in the retaining hole.

According to the above-described construction, since the laser diode is mounted on the base through the holder, in a case where the laser diode is determined to be defective in inspection prior to shipment, it is possible to discard only that laser diode. Accordingly, it is possible to reuse a diffraction grating and the base separated from the defective laser diode, so that the discarding cost can be reduced. In addition, since the base is isolated from the heat generation of the laser diode by means of the holder, it is possible to prevent the base from being thermally expanded and deformed.

According to a fourth aspect of the invention, the laser diode is clamped by the holder and the radiating plate.

According to the above-described construction, since the laser diode is clamped by the holder and the radiating plate, the laser diode can be reliably retained in the retaining hole of the holder. Since retaining means such as screws for the retention is not required, the fabrication cost can be reduced by that unrequired portion. In addition, since the areas of contact between the laser diode and the holder and between the laser diode and the radiating plate are large, the radiating effect is large.

According to a fifth aspect of the invention, the screws are passed through the screw inserting portions of the tongues and through holes in the holder, and are screwed into the threaded holes formed in the laser mounting surface, thereby securing the radiating plate and the holder to the base.

According to the above-described construction, the arrangement provided is such that the radiating plate and the holder are integrally secured to the base by means of the screws. Hence, as compared with the case where the radiating plate and the holder are separately secured, the securing operation can be performed speedily and easily with a fewer number of screws.

According to a sixth aspect of the invention, a recessed portion is formed on one or both of an inner surface of the holder and a portion of the laser mounting surface excluding peripheral edge portions of the threaded holes, thereby defining a gap between the holder and the base.

According to the above-described construction, since the holder and the base are merely in partial contact with each other, the base is not much subjected to the thermal effect due to the heat generation by the laser diode. Hence, it is possible to prevent the base from undergoing thermal deformation.

According to a seventh aspect of the invention, a plurality of radiating fins are projectingly provided on the holder.

According to the above-described construction, radiation can be further accelerated by the plurality of radiating fins provided projectingly on the holder, thereby allowing the laser diode to operate efficiently.

DETAILED DESCRIPTION OF THE PREFERRED EMBODIMENTS

Figure 13:
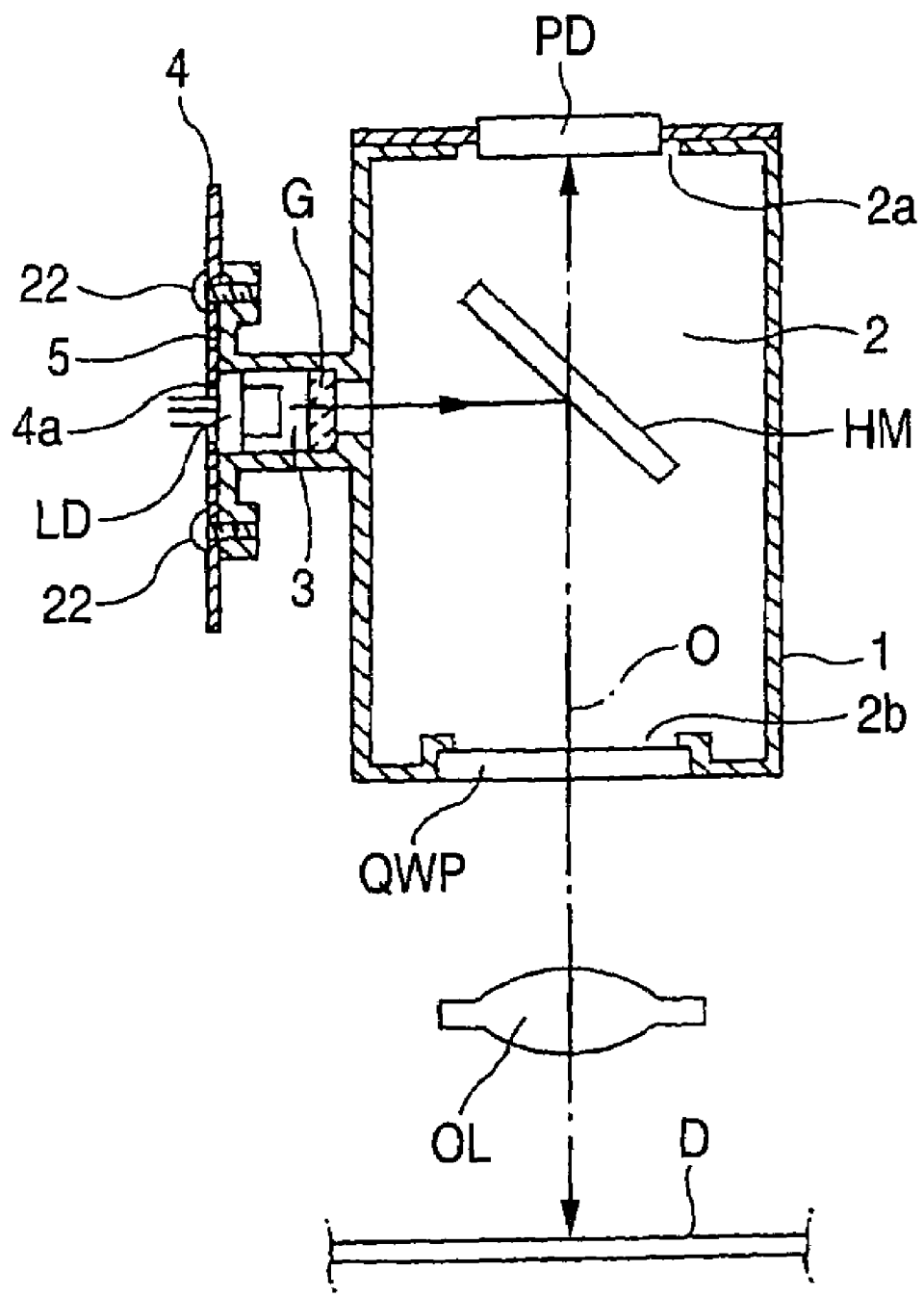
FIG. 13 is a diagram illustrating a conventional example.
Figure 14A:
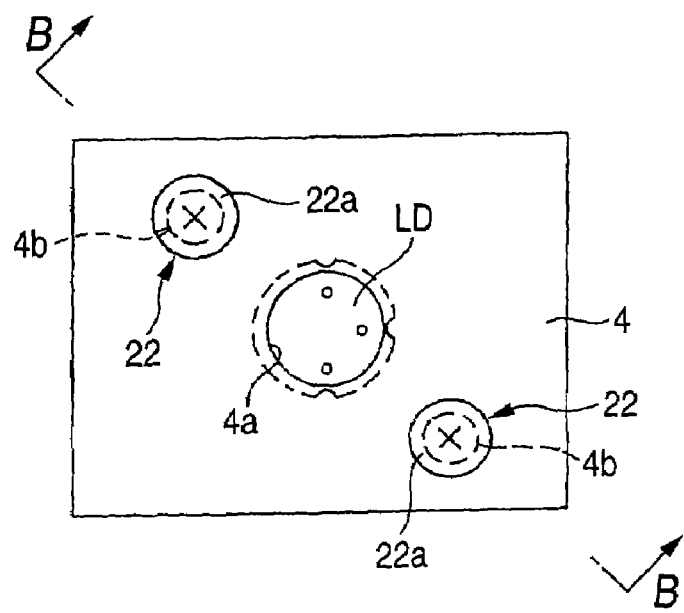
FIG. 14A is a front elevational view of a radiating plate.
Figure 14B:
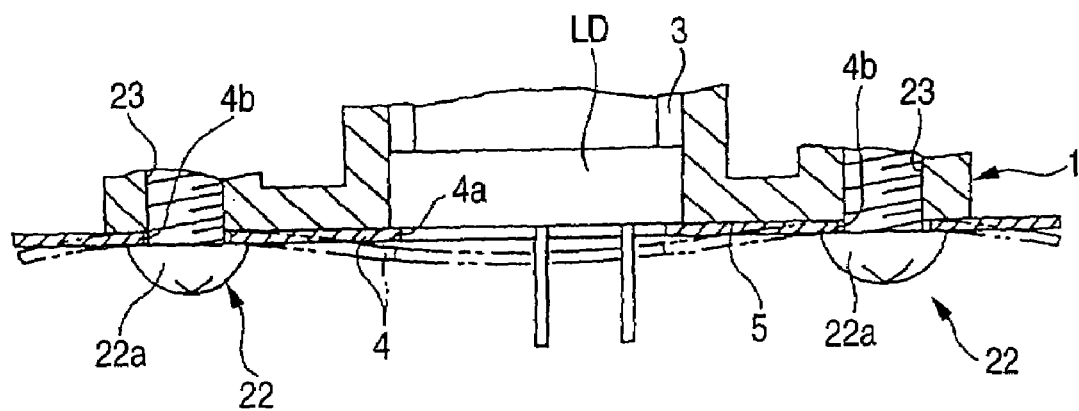
FIG. 14B is a view taken along line B-B in FIG. 14A.

FIGS. 1 to 7 show an optical pickup in accordance with an embodiment of the invention. This optical pickup has a metallic holder 6 which is retained on a laser mounting surface 5 formed at a periphery of an opening of a laser hole 3 of a base 1, as well as a metallic radiating plate 7 which is attached to an outer surface of the holder 6. Since the construction other than the one described above is substantially identical to that shown in FIGS. 13 to 14B, identical portions will be denoted by the same reference numerals, and a description thereof will be omitted.

The base 1 is formed of a hard synthetic resin, and, as shown in FIGS. 1 to 7, includes a tubular base body 1a with the laser mounting surface 5 formed thereon, a base plate portion 1b formed integrally with the base body 1a, and a pair of brackets 1c and a rack 1d which are projectingly provided as a unit on the base plate portion 1b. A guide rod 10 is movably fitted in through holes 9 of the brackets 1c, and a pinion (not shown) meshing with the rack 1d is rotated forwardly or reversely, thereby allowing the base 1 to move forwardly a or backwardly b along the guide rod 10.

Figure 3:
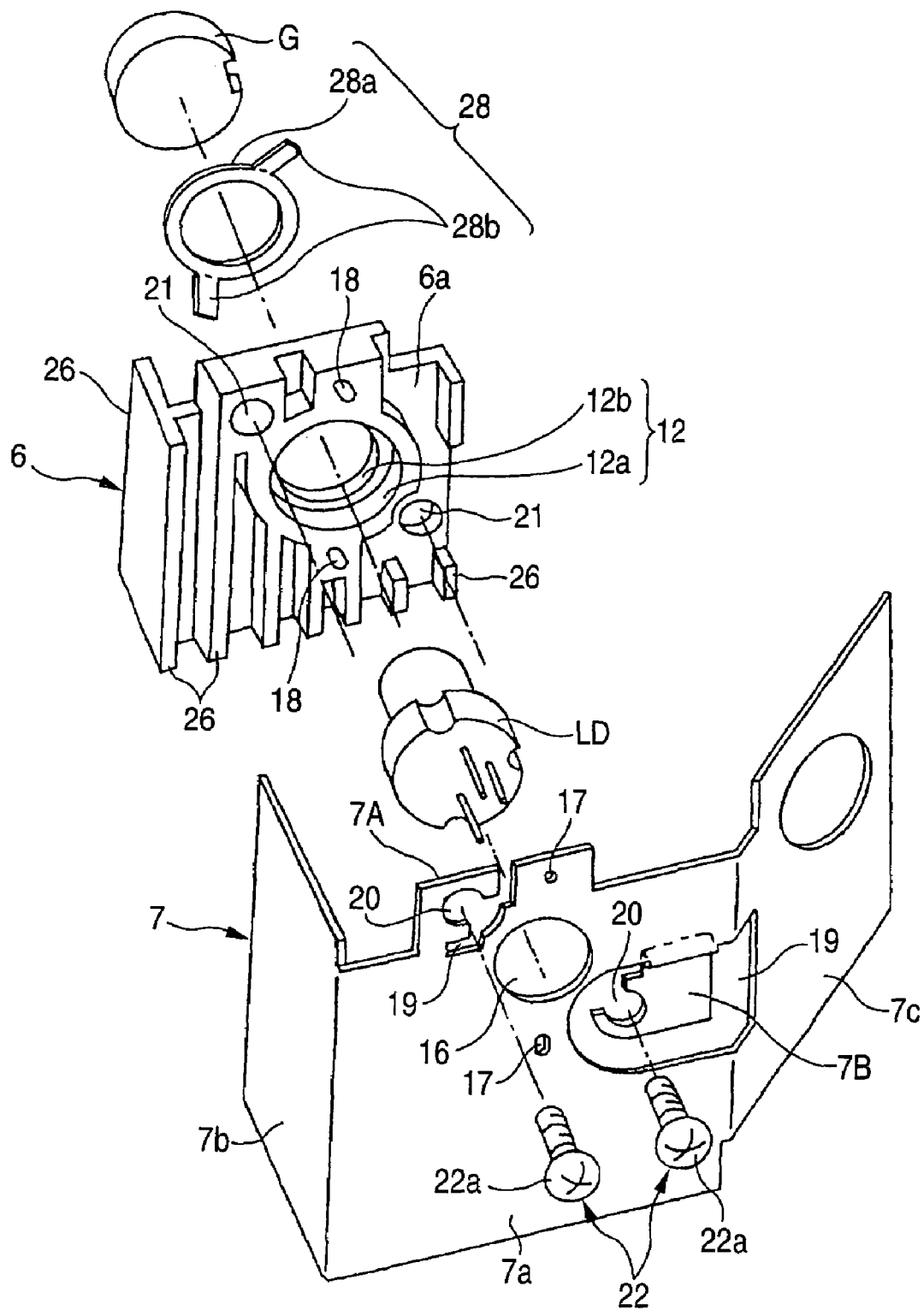
FIG. 3 is an exploded perspective view of a radiation structure of the optical pickup.
Figure 5:
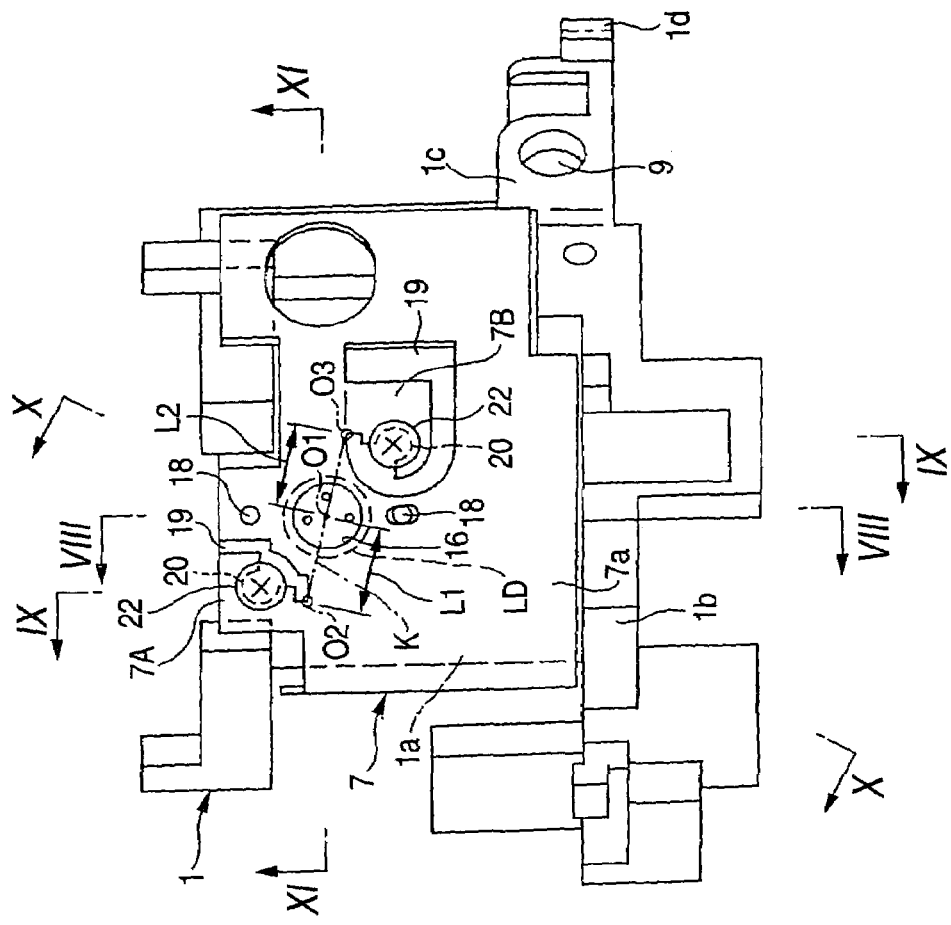
FIG. 5 is a front elevational view of the optical pickup.
Figure 4:
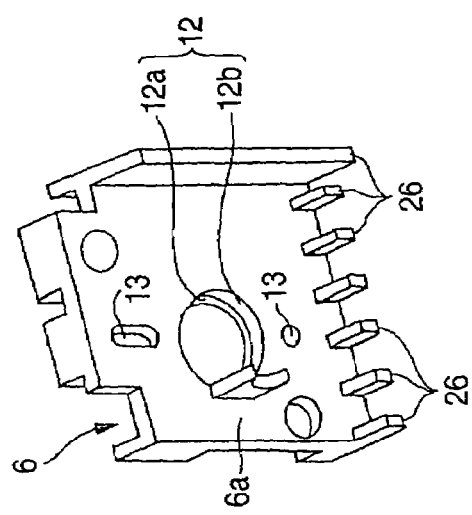
FIG. 4 is a perspective view of an inner surface side of a holder of the optical pickup.
Figure 8:
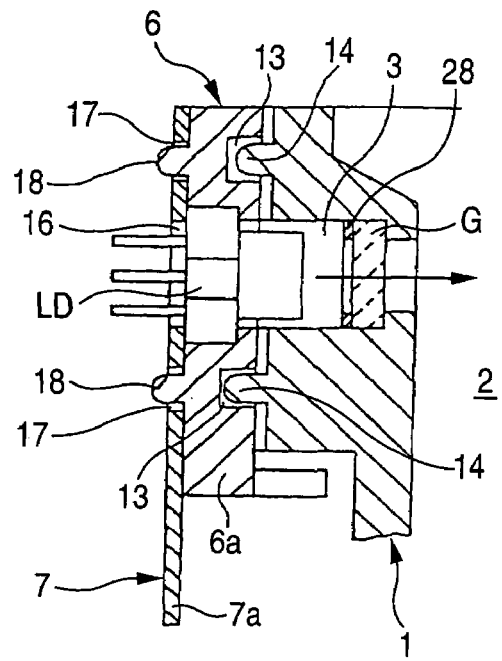
FIG. 8 is a view taken along line VIII-VIII in FIG. 5.

As shown in FIGS. 3 and 4, the holder 6 has a rectangular holder body 6a of substantially the same size as that of the laser mounting surface 5. A retaining hole 12, which is formed by a large-diameter portion 12a of substantially the same diameter as an outside diameter of a laser diode LD and a small-diameter portion 12b of a slightly smaller diameter than that of the large-diameter portion 12a, is penetratingly provided in a substantially central portion of the holder body 6a. The laser diode LD is fitted in the retaining hole 12, and two positioning recessed portions 13 provided on an inner peripheral surface of the holder body 6a with the retaining hole 12 positioned therebetween are respectively fitted to two positioning projecting portions 14 provided projectingly on the laser mounting surface 5. As a result, the laser diode LD is positioned concentrically with the laser hole 3 (see FIG. 8).

According to the above-described construction, since the laser diode LD is mounted on the base 1 through the holder 6, in a case where the laser diode LD is determined to be defective in inspection prior to shipment, it is possible to discard only that laser diode LD. Accordingly, it is possible to reuse a diffraction grating G and the base 1 separated from the defective laser diode LD, so that the discarding cost can be reduced. In addition, since the base 1 is isolated from the heat generation of the laser diode LD by means of the holder 6, it is possible to prevent the base 1 from being thermally expanded and deformed.

Figure 1:
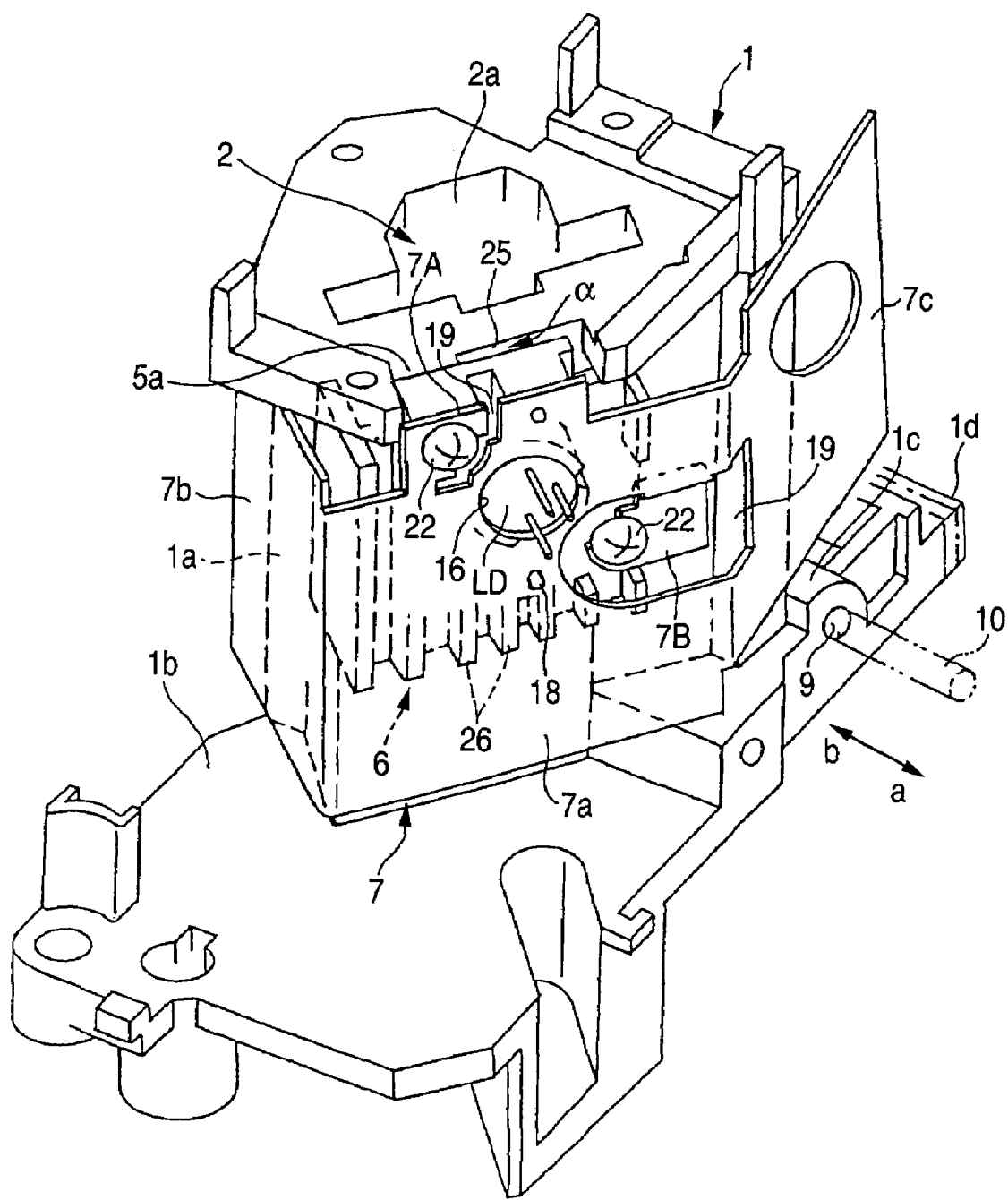
FIG. 1 is a perspective view of an optical pickup in accordance with an embodiment of the invention.

As shown in FIGS. 1 and 3, the radiating plate 7 has a radiating plate body 7a which opposes the holder 6 and is larger than the holder 6, as well as a pair of left and right wing plates 7b and 7c which are respectively bent from both ends of the radiating plate body 7a toward the base 1 side. An engaging hole 16 whose diameter is slightly smaller than that of the retaining hole 12 is formed in a substantially central portion of the radiating plate body 7a. As two positioning holes 17 formed in the radiating plate body 7a with the engaging hole 16 positioned therebetween are respectively fitted to two positioning projecting portions 18 provided projectingly on the holder body 6a, the radiating plate 7 is positioned with respect to the holder 6. At the same time, the engaging hole 16 is made concentric with the retaining hole 12, and the laser diode LD is clamped by the holder 6 and the radiating plate 7 (see FIG. 8).

Figure 9:
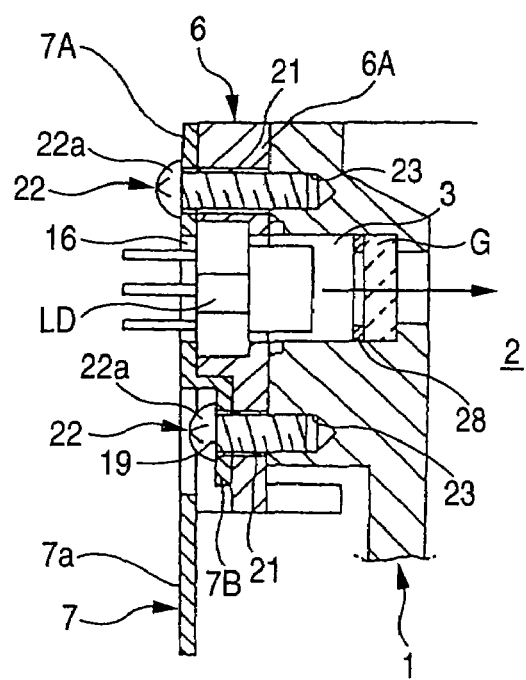
FIG. 9 is a view taken along line IX-IX in FIG. 5.

In addition, as a pair of slits 19 are formed in the radiating plate body 7a, a pair of tongues 7A and 7B are formed in the manner of point symmetry about the axis O1 of the engaging hole 16. Screw insertion recessed portions 20 formed in the respective tongues 7A and 7B are made to communicate with the slits 19. As screws 22 are passed through the screw inserting recessed portions 20 of the tongues 7A and 7B and the through holes 21 in the holder body 6a, and are screwed into threaded holes 23 formed in the laser mounting surface 5, the radiating plate 7 and the holder 6 are secured to the laser mounting surface 5 (see FIG. 9).

According to the above-described construction, since the tongues 7A and 7B are merely connected partially to the radiating plate 7, the radiating plate 7 can be caused to abut against the rear surface of the laser diode LD in such a way that the radiating plate 7 will not be deformed.

In addition, since the laser diode LD is clamped by the holder 6 and the radiating plate 7, the laser diode LD can be reliably retained in the retaining hole 12 of the holder 6. Since retaining means such as screws for the retention is not required, the fabrication cost can be reduced by that unrequired portion.

Further, the arrangement provided is such that the radiating plate 7 and the holder 6 are integrally secured to the base 1 by means of the screws 22. Hence, as compared with the case where the radiating plate 7 and the holder 6 are separately secured, the securing operation can be performed speedily and easily with a fewer number of screws 22.

Figure 12A:
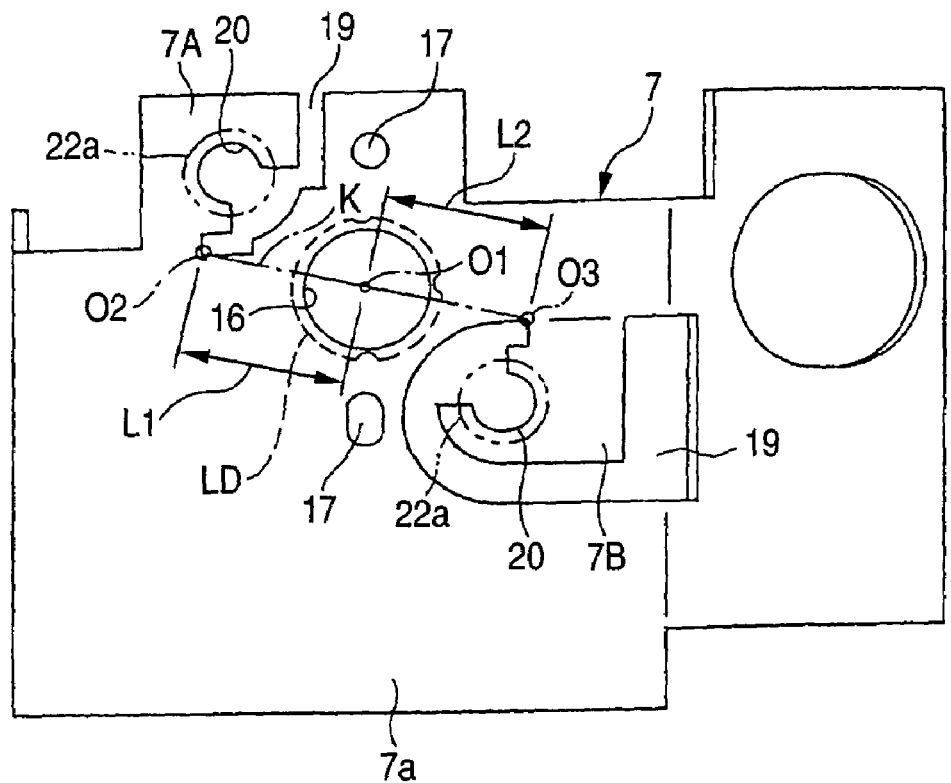
FIG. 12A is an explanatory diagram illustrating a pressing force applied to a radiating plate.
Figure 12B:
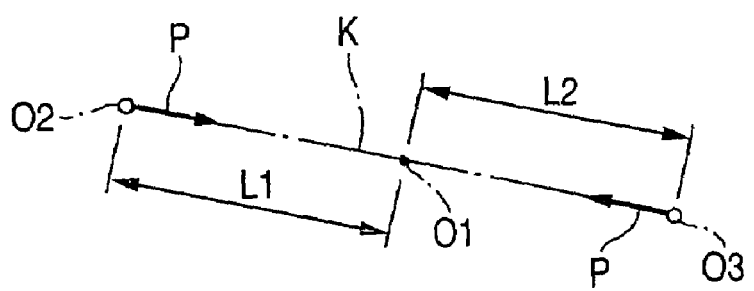
FIG. 12B is a diagram of a basic principle thereof.

As shown in FIGS. 12A and 12B, when the screws 22 are screwed in, the axis O1 of the engaging hole 16 is positioned on a phantom line K connecting the points of application of force O2 and O3 generated at proximal end portions of the tongues 7A and 7B. At the same time, distances L1 and L2 from the axis O1 to the respective points of application of force O2 and O3 are set to be substantially identical.

According to the above-described construction, since peripheral edge portions of the screw inserting recessed portions 20 of the tongues 7A and 7B are formed substantially in C-shapes which are resiliently deformable, as heads 22a of the screws 22 are brought into pressure contact with the tongues 7A and 7B with a predetermined pressing force P, the points of application of force O2 and O3 can be reliably generated at the proximal end portions of the tongues 7A and 7B.

In addition, the pressing forces Pacting from the respective points of application of force O2 and O3 toward the axis O1 are offset by each other, and components of force are not generated from both pressing forces P. Accordingly, the bending moment (see bending moment T in FIG. 15B) with the axis O1 of the engaging hole 16 as a center is not generated, and the laser diode LD is not displaced via the radiating plate 7 by that bending moment. Hence, the laser light can be precisely projected from the laser diode LD without being positionally offset, so that it is possible to accurately read the information recorded on a disk D.

Figure 2:
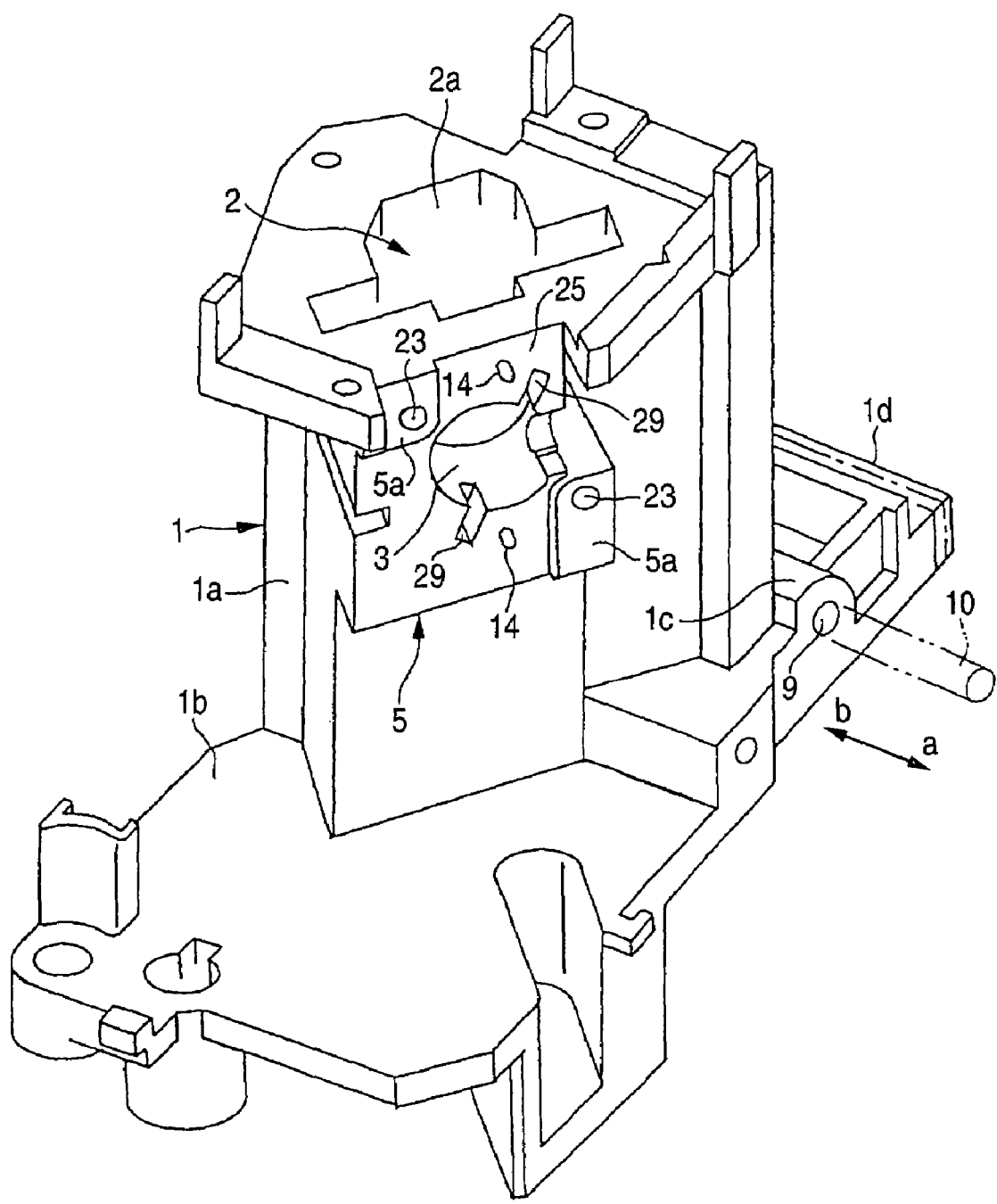
FIG. 2 is a perspective view of a base of the optical pickup.

As shown in FIGS. 1 and 2, a recessed portion 25 is formed on a portion of the laser mounting surface 5 excluding peripheral edge portions 5a of the respective threaded holes 23, so that the peripheral portions 5a of the threaded holes 23 are formed to be one step higher. Consequently, a gap α is defined between the holder 6 and the base 1 through that recessed portion 25, and the holder 6 and the base 1 are merely in partial contact with each other. Therefore, the base 1 is not much subjected to the thermal effect due to the heat generation by the laser diode LD.

As shown in FIGS. 3 and 4, a plurality of radiating fins 26 are projectingly provided on an entire outer surface and a peripheral edge portion of an inner surface of the holder body 6a. Radiation can be further accelerated by the plurality of radiating fins 26, thereby allowing the laser diode LD to operate efficiently.

In short, as described above, since areas of contact between the laser diode LD and the holder 6 and between the laser diode LD and the radiating plate 7 are large, and the plurality of radiating fins 26 are projectingly provided on the holder 6, the radiation of the laser diode LD is accelerated, and the laser diode LD can be operated efficiently. In addition, since the base 1 is isolated from the heat generation of the laser diode LD by means of the holder 6, and the holder 6 and the base 1 are merely in partial contact with each other, there is no possibility of the synthetic resin-made base 1 being thermally expanded and deformed by the heat generation of the laser diode LD. Hence, it is possible to prevent the occurrence of a read error by maintaining an optical axis O (see FIG. 13) connecting a photodiode PD and an objective lens OL rectilinearly, as required. It is thereby possible to fabricate an inexpensive and precision optical pickup.

Figure 10:
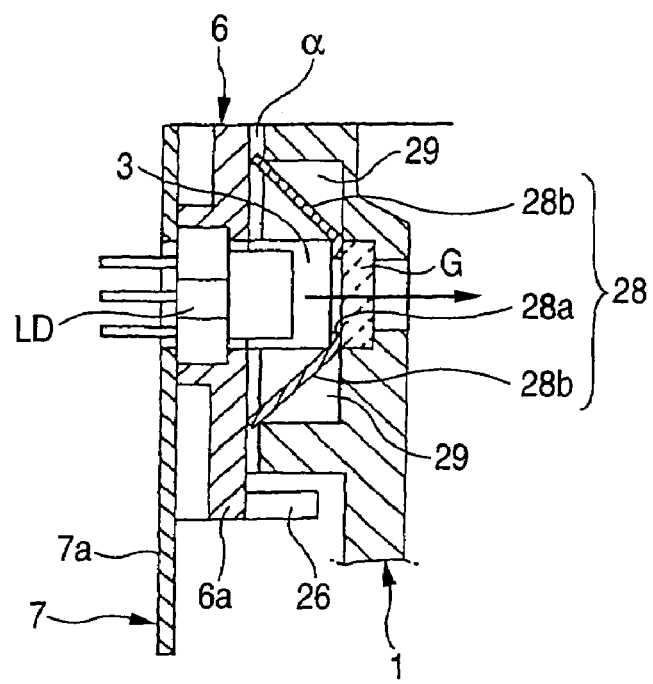
FIG. 10 is a view taken along line X-X in FIG. 5.
Figure 11:
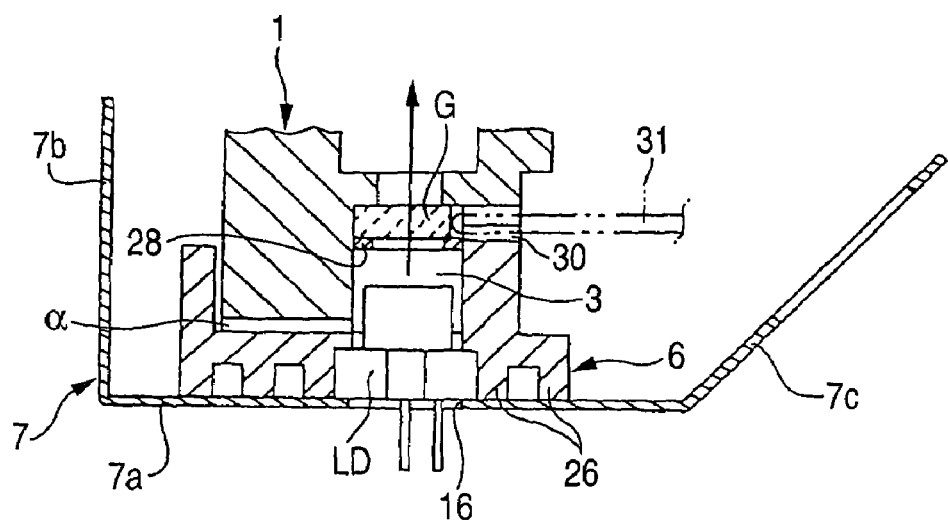
FIG. 11 is a view taken in the direction of arrows along line IX-IX in FIG. 5.

In FIG. 3, reference numeral 28 denotes a presser spring made of a leaf spring which consists of a ring portion 28a and a pair of leg portions 28b provided projectingly on the ring portion 28a and extending outward. As shown in FIGS. 10 and 11, the ring portion 28a is inserted in the laser hole 3, and the leg portions 28b are inserted in a pair of groove portions 29 communicating with the laser hole 3. Consequently, the presser spring 28 is interposed between the holder 6 and the diffraction grating G in such a manner as to be resiliently deformed, thereby preventing the diffraction grating G from rotating unexpectedly.

Figure 6:
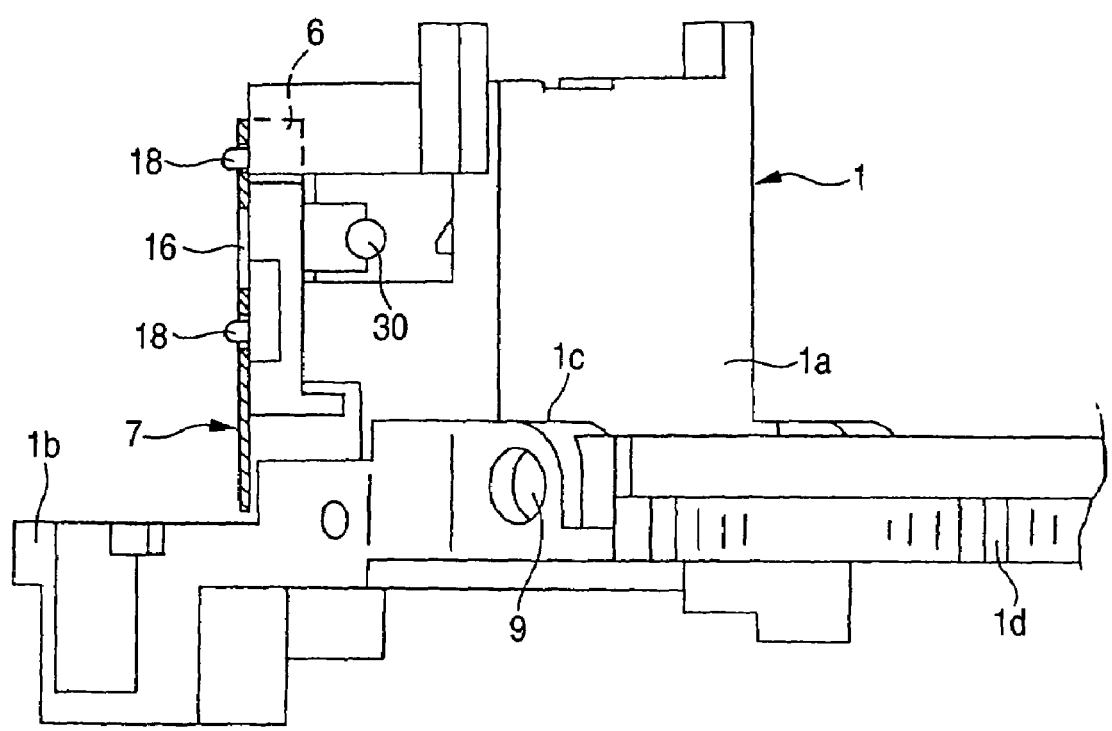
FIG. 6 is a side elevational view of the optical pickup.
Figure 7:
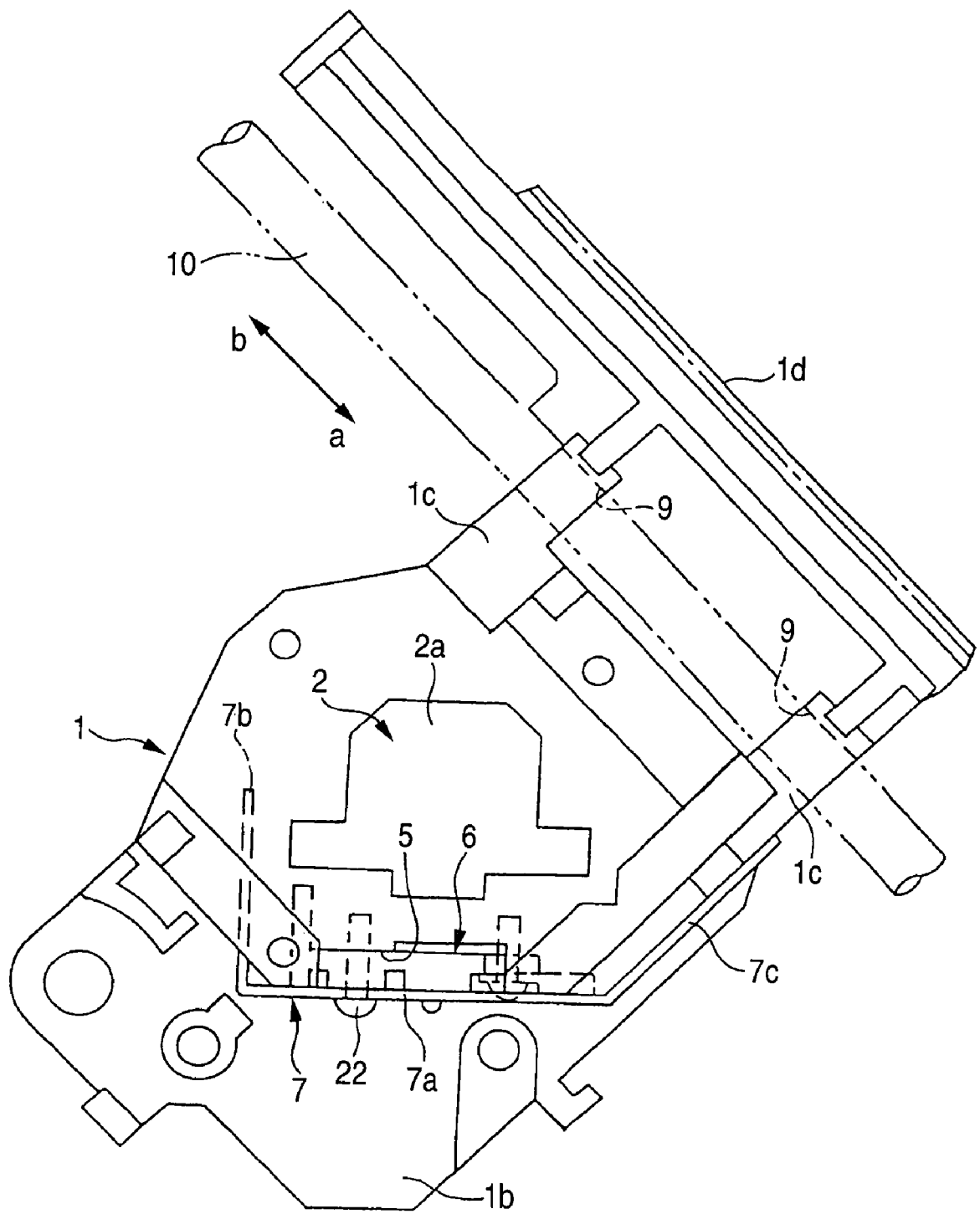
FIG. 7 is a plan view of the optical pickup.

As shown in FIGS. 6 and 11, an operation hole 30 for a diffraction grating, which communicates with the laser hole 3, is penetratingly provided in the base body 1a. As an operation rod 31 inserted in the operation hole 30 is brought into contact with an outer peripheral surface of the diffraction grating, and the operation rod 31 is operated, the diffraction grating G is rotated to disperse the laser light, as desired.

Figure 16:
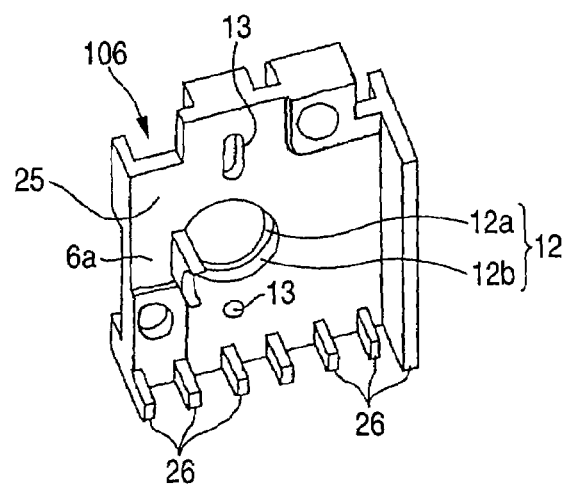
FIG. 16 is a diagram illustrating a modification in a holder.

In the above-described construction, the recessed portion 25 is formed on the laser mounting surface 5 to form the gap α between the holder 6 and the base 1, the invention is not limited to the same. The recessed portion 25 may be formed on an inner surface of the holder 6 as shown in FIG. 16, or the recessed portion may be formed on both the inner surface of the holder 6 and the laser mounting surface 5.

Figure 15A:
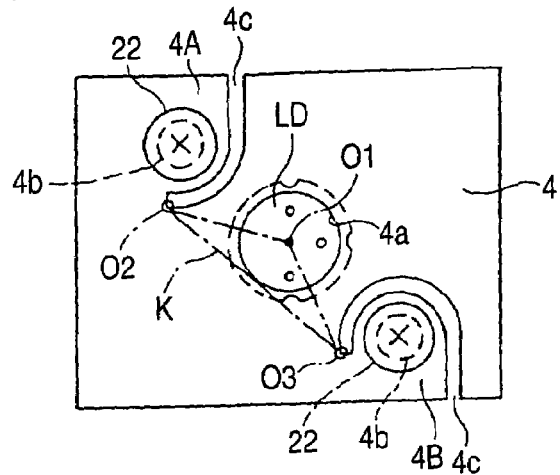
FIG. 15A is an explanatory diagram illustrating the pressing force in a modification of the radiating plate.

As shown in FIG. 15A, it is conceivable to form a pair of slits 4c in a radiating plate 4 and to thereby form a pair of tongues 4A and 4B in the manner of point symmetry about an axis O1 of an engaging hole 4a. Also, it is conceivable to pass the screws 22 through the through holes 4b in the respective tongues 4A and 4B and screw them in the threaded holes 23, thereby causing the radiating plate 4 to abut against a rear surface of the laser diode LD in such a way that the radiating plate 4 will not be deformed.

Figure 15B:
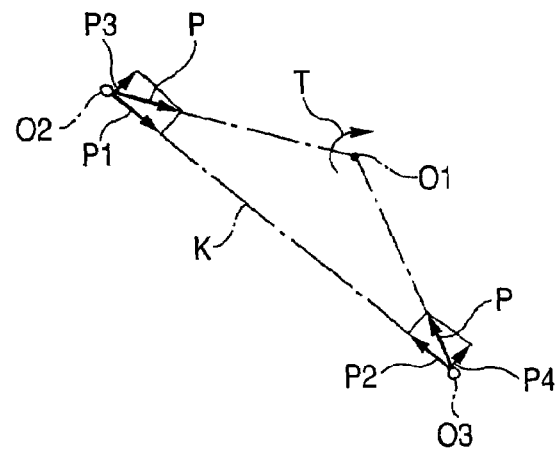
FIG. 15B is a diagram of the basic principle thereof.

According to the above-described construction, as the screws 22 are screwed in and the heads 22a of the screws 22 are brought into pressure contact with the tongues 4A and 4B with a predetermined pressing force P, the axis O1 of the engaging hole 4a is positionally offset from a phantom line K connecting points of application of force O2 and O3 generated at proximal end portions of the tongues 4A and 4B. Therefore, as shown in FIG. 15B, a pressing force P acting from each of the points of application of force O2 and O3 toward the axis O1 is divided into a component of force P1 or P2 acting in the direction of the phantom line K and a component of force P3 or P4 acting in a direction perpendicular to the phantom line K. The components of force P1 and P2 are offset by each other, and the bending moment T generated about the axis O1 due to the components of force P3 and P4 is applied to the laser diode LD through the radiating plate 4. As a result, the laser diode LD becomes displaced, and the laser light projected from that laser diode LD becomes positionally offset, thereby possibly making it difficult to accurately read the information recorded on the disk D.

As was described above, according to the first aspect of the invention, as screws are passed through the screw inserting portions of the tongues and the through holes in the holder, and are screwed into the threaded holes of the base, the radiating plate is secured to the base. In addition, since the tongues are merely connected partially to the radiating plate, the radiating plate can be caused to abut against the rear surface of the laser diode in such a way that the radiating plate will not be deformed.

In addition, since peripheral edge portions of the screw inserting portions of the tongues are formed substantially in C-shapes which are resiliently deformable, as heads of the screws are brought into pressure contact with the tongues with a predetermined pressing force, the points of application of force can be reliably generated at the proximal end portions of the tongues.

The axis of the engaging hole formed in a substantially central portion of the radiating plate is positioned on a phantom line connecting the two points of application of force. At the same time, distances from the axis to the respective points of application of force are set to be substantially identical. Therefore, the pressing forces acting from the respective points of application of force toward the axis are offset by each other, and components of force are not generated from both pressing forces. Accordingly, the bending moment with the axis of the engaging hole as a center is not generated, and the laser diode is not displaced via the radiating plate by that bending moment. Hence, the laser light can be precisely projected from the laser diode without being positionally offset, so that it is possible to accurately read the information recorded on the disk.

Further, since the laser diode is mounted on the base through the holder, in a case where the laser diode is determined to be defective in inspection prior to shipment, it is possible to discard only that laser diode. Accordingly, it is possible to reuse a diffraction grating and the base separated from the defective laser diode, so that the discarding cost can be reduced. In addition, since the base is isolated from the heat generation of the laser diode by means of the holder, it is possible to prevent the base from being thermally expanded and deformed.

Furthermore, since the laser diode is clamped by the holder and the radiating plate, the laser diode can be reliably retained in the retaining hole of the holder. Since retaining means such as screws for the retention is not required, the fabrication cost can be reduced by that unrequired portion.

Furthermore, the arrangement provided is such that the radiating plate and the holder are integrally secured to the base by means of the screws. Hence, as compared with the case where the radiating plate and the holder are separately secured, the securing operation can be performed speedily and easily with a fewer number of screws.

Still further, since areas of contact between the laser diode and the holder and between the laser diode and the radiating plate are large, and the plurality of radiating fins are projectingly provided on the holder, the radiation of the laser diode is accelerated, and the laser diode can be operated efficiently. In addition, since the base is isolated from the heat generation of the laser diode by means of the holder, and the holder and the base are merely in partial contact with each other, there is no possibility of the synthetic resin-made base being thermally expanded and deformed by the heat generation of the laser diode. Hence, it is possible to prevent the occurrence of a read error by maintaining the optical axis connecting the photodiode and the objective lens rectilinearly, as required. It is thereby possible to fabricate an inexpensive and precision optical pickup.

According to the second aspect of the invention, as screws are passed through the screw inserting portions of the tongues and are screwed into the threaded holes of the base, the radiating plate is secured to the base. In addition, since the tongues are merely connected partially to the radiating plate, the radiating plate can be caused to abut against the rear surface of the laser diode in such a way that the radiating plate will not be deformed.

In addition, since peripheral edge portions of the screw inserting portions of the tongues are formed substantially in C-shapes which are resiliently deformable, as heads of the screws are brought into pressure contact with the tongues with a predetermined pressing force, the points of application of force can be reliably generated at the proximal end portions of the tongues.

Further, the axis of the engaging hole formed in a substantially central portion of the radiating plate is positioned on a phantom line connecting the two points of application of force. At the same time, distances from the axis to the respective points of application of force are set to be substantially identical. Therefore, the pressing forces acting from the respective points of application of force toward the axis are offset by each other, and components of force are not generated from both pressing forces. Accordingly, the bending moment with the axis as a center is not generated, and the laser diode is not displaced via the radiating plate by that bending moment. Hence, the laser light can be precisely projected from the laser diode without being positionally offset, so that it is possible to accurately read the information recorded on the disk.

According to the third aspect of the invention, since the laser diode is mounted on the base through the holder, in a case where the laser diode is determined to be defective in inspection prior to shipment, it is possible to discard only that laser diode. Accordingly, it is possible to reuse a diffraction grating and the base separated from the defective laser diode, so that the discarding cost can be reduced. In addition, since the base is isolated from the heat generation of the laser diode by means of the holder, it is possible to prevent the base from being thermally expanded and deformed.

According to the fourth aspect of the invention, since the laser diode is clamped by the holder and the radiating plate, the laser diode can be reliably retained in the retaining hole of the holder. Since retaining means such as screws for the retention is not required, the fabrication cost can be recuded by that unrequired portion. In addition, since the areas of contact between the laser diode and the holder and between laser diode and the radiating plate are large, the radiating effect is large.

According to a fifth aspect of the invention, the radiating plate and the holder are integrally secured to the base by means of the screws. Hence, as compared with the case where the radiating plate and the holder are separately secured, the securing operation can be performed speedily and easily with a fewer number of screws.

According to the sixth aspect of the invention, since the holder and the base are merely in partial contact with each other, the base is not much subjected to the thermal effect due to the heat generation by the laser diode. Hence, it is possible to prevent the base from undergoing thermal deformation.

According to the seventh aspect of the invention, radiation can be further accelerated by the plurality of radiating fins provided projectingly on the holder, thereby allowing the laser diode to operate efficiently.

What is claimed is:

1. An optical pickup comprising:
   a base made of synthetic resin, the base having a light passage hole penetrating the base, a laser hole communicating with the light passage hole, and a laser mounting surface formed at a periphery of an opening of the laser hole and having threaded holes;
   a half mirror disposed in the light passage hole;
   a photodiode disposed on one end opening of the light passage hole;
   a collimator lens disposed on another end opening of the light passage hole;

an objective lens provided at the another end opening of the light passage hole;
a laser diode disposed in the laser hole;
a metallic holder retained on the laser mounting surface, the holder having a retaining hole provided penetratingly in the holder concentrically with the laser hole and through holes; and
a metallic radiating plate attached to an outer surface of the holder, the radiating plate having an engaging hole provided penetratingly in a substantially central portion of the radiating plate and a diameter of which is slightly smaller than that of the retaining hole;
wherein laser light is projected from the laser diode onto a disk through the half mirror, the collimator lens, and the objective lens, and reflected light thereof is received by the photodiode through the half mirror, so as to read information recorded on the disk;
the laser diode is fitted in the retaining hole of the holder;
the engaging hole of the radiating plate is positioned concentrically with the laser diode, thereby clamping the laser diode by the radiating plate and the holder;
slits are formed in the radiating plate to form a pair of tongues in the manner of point symmetry about an axis of the engaging hole;
screw inserting portions formed in the respective tongues are made to communicate with the slits;
screws are passed through the screw inserting portions of the tongues and the through holes of the holder, and are screwed into the threaded holes of the laser mounting surface, thereby securing the radiating plate and the holder to the base;
the axis of the engaging hole is positioned on a phantom line connecting points of application of force generated at proximal end portions of the tongues when the screws are screwed in, and distances from the axis to the respective points of application of force are set to be substantially identical;
a recessed portion is formed on a portion of the laser mounting surface excluding peripheral edge portions of the threaded holes, thereby defining a gap between the holder and the base; and
a plurality of radiating fins are projectingly provided on the holder.

2. An optical pickup comprising:
a base made of synthetic resin, the base having a light passage hole penetrating the base, a laser hole communicating with the light passage hole, and threaded holes;
a laser diode disposed in the laser hole;
a photodiode; and
a radiating plate having an engaging hole provided penetratingly in a substantially central portion of the radiating plate, the radiating plate being made to abut against a rear surface of the laser diode while positioning the engaging hole concentrically with the laser diode;
wherein laser light is projected from the laser diode onto a disk and reflected light thereof is received by the photodiode so as to read information recorded on the disk;
slits are formed in the radiating plate to form a pair of tongues arranging an axis of the engaging hole therebetween;
screw inserting portions formed in the respective tongues are made to communicate with the slits; and
screws are passed through the screw inserting portions of the tongues and screwed into the threaded holes of the base, thereby securing the radiating plate to the base.

3. The optical pickup according to claim 2, wherein an axis of the engaging hole is positioned on a phantom line connecting points of application of force generated at proximal end portions of the tongues when the screws are screwed in.

4. An optical pickup comprising:
a base made of synthetic resin, the base having a light passage hole penetrating the base, a laser hole communicating with the light passage hole, and threaded holes;
a laser diode disposed in the laser hole;
a photodiode; and
a radiating plate having an engaging hole provided penetratingly in a substantially central portion of the radiating plate, the radiating plate being made to abut against a rear surface of the laser diode while positioning the engaging hole concentrically with the laser diode;
wherein laser light is projected from the laser diode onto a disk and reflected light thereof is received by the photodiode so as to read information recorded on the disk;
slits are formed in the radiating plate to form a pair of tongues arranging an axis of the engaging hole therebetween;
screw inserting portions formed in the respective tongues are made to communicate with the slits; and
screws are passed through the screw inserting portions of the tongues and screwed into the threaded holes of the base, thereby securing the radiating plate to the base;
wherein an axis of the engaging hole is positioned on a phantom line connecting points of application of force generated at proximal end portions of the tongues when the screws are screwed in; and
wherein distances from the axis of the engaging hole to the respective points of application of force are set to be substantially identical.

5. The optical pickup according to claim 2, further comprising a metallic holder retained on a laser mounting surface formed at a periphery of an opening of the laser hole of the base, the holder having a retaining hole provided penetratingly in the holder concentrically with the laser hole;
wherein the laser diode is fitted in the retaining hole.

6. The optical pickup according to claim 5, wherein the laser diode is clamped by the holder and the radiating plate.

7. The optical pickup according to claim 6, wherein the screws are passed through the screw inserting portions of the tongues and through holes in the holder, and are screwed into the threaded holes formed in the laser mounting surface, thereby securing the radiating plate and the holder to the base.

8. The optical pickup according to claim 5, wherein a recessed portion is formed on one or both of an inner surface of the holder and a portion of the laser mounting surface excluding peripheral edge portions of the threaded holes, thereby defining a gap between the holder and the base.

9. The optical pickup according to claim 5, wherein a plurality of radiating fins are projectingly provided on the holder.

* * * * *